United States Patent [19]

Ho

[11] Patent Number: 6,099,621
[45] Date of Patent: Aug. 8, 2000

[54] MEMBRANES COMPRISING AMINOACID SALTS IN POLYAMINE POLYMERS AND BLENDS

[75] Inventor: W. S. Winston Ho, Annandale, N.J.

[73] Assignee: Exxon Research and Engineering Company, Florham Park, N.J.

[21] Appl. No.: 09/200,066

[22] Filed: Nov. 25, 1998

Related U.S. Application Data

[63] Continuation of application No. 08/815,017, Mar. 14, 1997, abandoned.

[51] Int. Cl.[7] ............................ B01D 69/00; B01D 71/06; C08K 5/17; C08K 5/19
[52] U.S. Cl. ............................ 95/139; 524/300; 524/301; 264/212; 525/56; 525/57; 525/61; 525/191; 525/217
[58] Field of Search .................................... 524/300, 301; 264/212; 95/139, 116; 525/56, 57, 61, 191, 217

[56] References Cited

U.S. PATENT DOCUMENTS 4,983,291   1/1991   Chau et al. ............................ 210/490

FOREIGN PATENT DOCUMENTS 1960954   7/1996   Germany.

*Primary Examiner*—Jeffrey C. Mullis
*Attorney, Agent, or Firm*—Ronald D. Hantman

[57] ABSTRACT

The present invention is directed toward a composition comprising a polyamine or its polymer blend and at least one salt of an aminoacid, the salt of the aminoacid being present in an amount ranging from about 10 to 80 wt % based on the total weight of the composition. Another embodiment of the present invention comprises a membrane suitable for use in separating $CO_2$ from gas streams containing $CO_2$, especially $H_2$ rich gas streams containing $CO_2$ and CO. The membrane of this invention with polyamine shows higher $CO_2$ selectivity and permeability than the prior membrane without polyamine.

10 Claims, 2 Drawing Sheets

MEMBRANES COMPRISING AMINOACID SALTS IN POLYAMINE POLYMERS AND BLENDS

This application is a Rule 53(b) Continuation of U.S. Ser. No. 08/815,017, filed Mar. 14, 1997, now abandoned.

FIELD OF THE INVENTION

The present invention relates to polymer compositions particularly suitable for forming membranes that are useful in separating $CO_2$ from gaseous streams, particularly from gas streams containing $H_2$, $CO_2$ and CO.

BACKGROUND OF THE INVENTION

There are numerous industrial processes in which gas streams are produced containing $CO_2$ as one of the components of the gas stream and in which it is desirable to selectively remove the $CO_2$ from the other components. One technique used to selectively remove $CO_2$ from process gas streams is to absorb the $CO_2$ in an amine solution. Another technique used is to adsorb the $CO_2$ on a molecular sieve.

The use of membranes to separate components in a process stream has long been pursued by the scientific and industrial community. Nonetheless, there remains a need for a membrane that has a high $CO_2$ permeability and selectivity.

U.S. Ser. No. 499,267 (by this inventor) claims membranes comprising salts of aminoacids in hydrophilic polymers for removal of $CO_2$ from gas streams containing $CO_2$. That patent application does not cover the membrane compositions and polymer systems disclosed in the present invention. In addition, the membrane of the present invention with polyamine has outperformed that of the prior invention without polyamine.

It is an object of the present invention to provide novel polymer compositions that are suitable in formation of membranes useful in separating $CO_2$ from process gases, particularly from a $H_2$ rich gas stream containing $CO_2$ and CO.

SUMMARY OF THE INVENTION

In its simplest sense, the present invention is directed toward a composition comprising a polyamine or its polymer blend and at least one salt of an aminoacid, the salt of the aminoacid being present in an amount ranging from about 10 to about 80 wt % based on the total weight of the composition.

Another embodiment of the present invention comprises a membrane suitable for use in separating $CO_2$ from gas streams containing $CO_2$, especially $H_2$ rich gas streams containing $CO_2$ and CO. The membrane of this invention with polyamine shows higher $CO_2$ selectivity and permeability than the prior membrane without polyamine.

These and other embodiments of the present invention will become apparent upon a reading of the detailed description of the invention which follows.

DETAILED DESCRIPTION OF THE INVENTION

Figure 1:
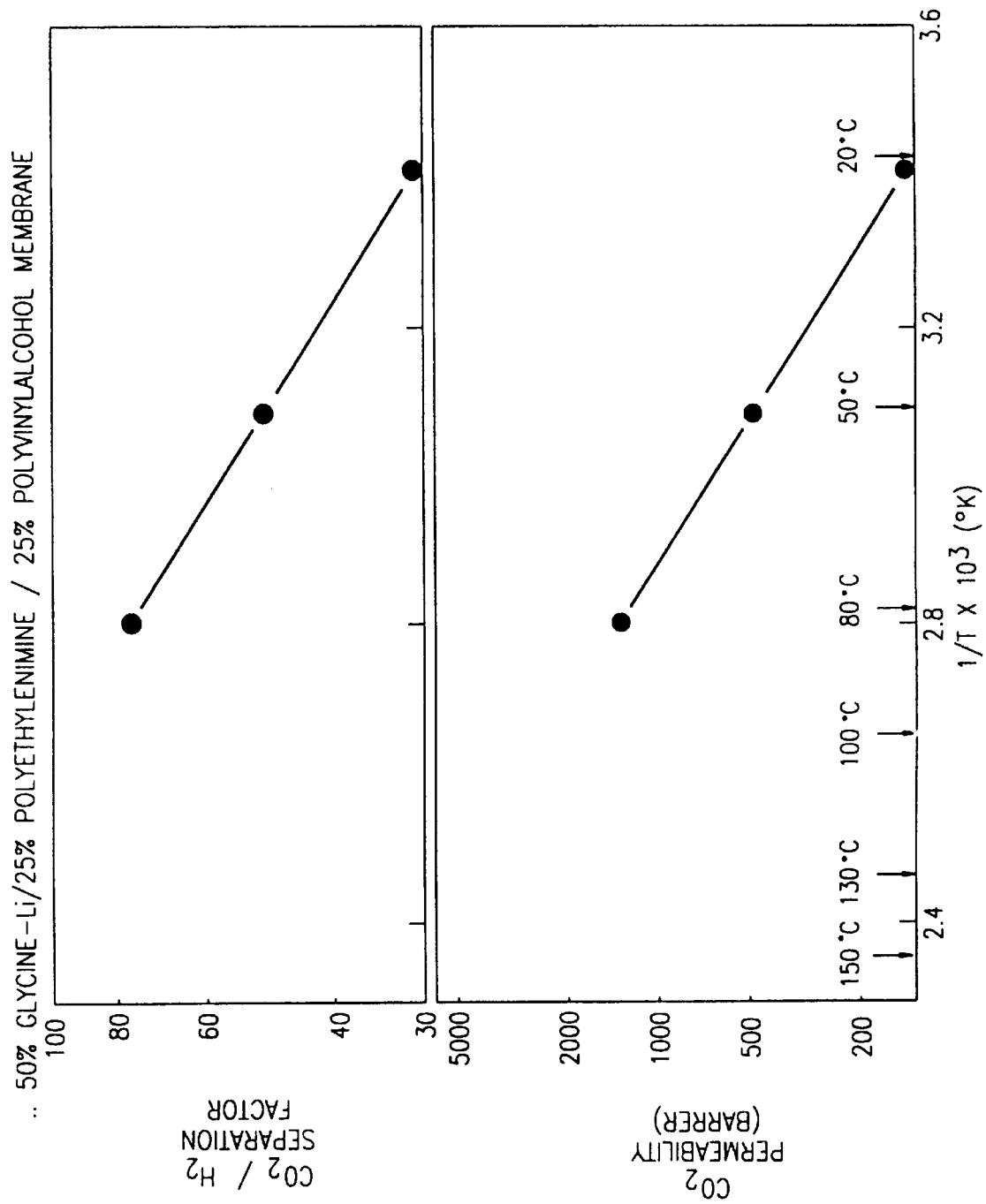
FIG. 1 shows the selectivity/permeability increase with temperature for the membrane of Example 9.

The compositions of the present invention comprise a polyamine or its polymer blend and at least one salt of an aminoacid, the salt of an aminoacid being present in an amount ranging from about 10 to about 80 wt % based on the total weight of the composition and preferably about 40 to about 65 wt %.

The polyamines suitable in the practice of the present invention include polyethylenimine, polyallylamine, poly-N-1,2-dimethylpropylallylamine, poly-2-vinylpiperidine, poly-4-vinylpiperidine, blends and copolymers thereof. The polymers suitable for blending with the polyamines in the present invention include polyvinylalcohol, polyvinylpyrrolidone, polyethyleneoxide, polyacrylamide, polyvinylacetate, blends and copolymers thereof. In general, the polyamines and polymers will have weight average molecular weights in the range of about 20,000 to 2,000,000 and preferably in the range from about 50,000 to 200,000. Particularly preferred polyamines useful in the present invention are polyethylenimines with molecular weights in the range from about 50,000 to 100,000. Particularly preferred polymers usefull for blending with the polyamines in the present invention are polyvinylalcohols having molecular weights in the range from about 50,000 to 150,000.

The aminoacid salts in the compositions of the present invention are selected from salts having the formulae:

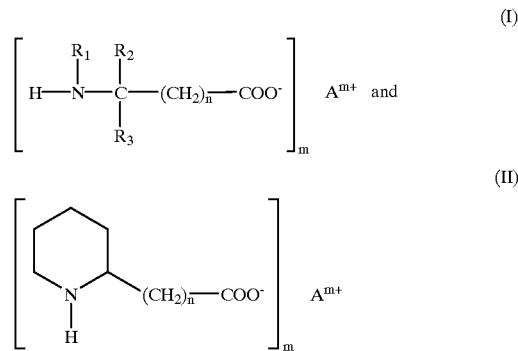

wherein $R_1$, $R_2$ and $R_3$ are hydrogen or alkyl groups having from 1 to 4 carbon atoms, n is an integer ranging from 0 to 4, $A^{m+}$ is a cation having a valence of 1 to 3 and selected from metals and an amine cation having the formula:

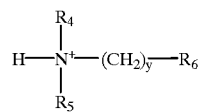

wherein $R_4$ and $R_5$ are hydrogen or alkyl groups having from 1 to 4 carbon atoms, $R_6$ is hydrogen, an alkyl groups of from 1 to 4 carbon atoms or an alkylamino group of from 2 to 6 carbons and 1 to 4 nitrogen atoms, y is an integer ranging from 1 to 4, and m is an integer equal to the valence of the cation, $A^{m+}$. When $A^{m+}$ is a metal cation, preferably it is selected from metals of Groups IA (especially lithium), IIA, IIIA (especially aluminum) and VIII (especially iron) of the Periodic Tables of the Elements. The Periodic Table referred to herein is that appearing in the inside cover of Perry's Chemical Engineers' Handbook, 6th Edition, McGraw-Hill Book Company (1984).

As previously stated, the amount of aminoacid salt to be present in the composition is in the range from about 10 to 80 wt % based on the total weight of the composition, and preferably about 40 to about 65 wt %.

The compositions of the present invention are prepared by first forming a solution of the polyamine or its polymer blend and the aminoacid salt in a suitable solvent such as water. Generally, the amount of water employed will be in the range from about 70% to 95%. The composition can then be recovered from the solution by removing the solvent, for example, by allowing the solvent to evaporate; however, it is preferred to use the solution in forming a nonporous membrane. Thus, the resulting solution is formed into a nonporous membrane by techniques well known in the art. For example, the polyamine polymer solution can be cast onto a solid support with techniques such as "knife casting" or "dip casting". Knife casting, of course, is a process in which a knife is used to draw a polyamine polymer solution across a flat surface to form a thin film of the polyamine polymer solution of uniform thickness after which the solvent of the polyamine polymer solution is evaporated, at ambient or temperatures up to about 100° C., to yield the fabricated membrane. When, for example, a glass plate is used as the flat surface, the membrane can then be removed from the support providing a free standing polyamine polymer membrane. When, alternatively, the flat surface used is a non-selective porous support such as porous polytetrafluoroethylene, the resulting membrane is a composite membrane comprising the selective membrane polymer and the support. Dip casting is the process in which the polyamine polymer solution is contacted with a non-selective porous support. Then excess solution is permitted to drain from the support, and the solvent of the polyamine polymer solution is evaporated at ambient or elevated temperatures as above. The membrane comprises both the polyamine polymer and the porous support.

The membranes of the present invention also may be shaped in the form of hollow fibers, tubes, films, sheets and the like.

In an alternate embodiment of the present invention, a cross-linking agent is added to the polyamine or its polymer blend and aminoacid salt solution before forming a membrane from it.

Suitable cross-linking agents include formaldehyde, divinyl sulfone, toluene diisocyanate, glyoxal, trimethylol melamine, terephthalatealdehyde, epichlorohydrin, vinyl acryl ate, and maleic anhydride. Formaldehyde, divnyl sulfone and toluene diisocyanate are particularly preferred.

The amount of cross-linking agent employed will be in the range of about 1 to about 20 wt % based on the total weight of the solid composition formed from the solution. Membranes formed from the solution containing a cross-linking agent typically are heated at a temperature and for a time sufficient for cross-linking to occur. Generally, cross-linking temperatures in the range from about 80° C. to about 120° C. are employed. Cross-linking will occur in from about 1 to 72 hours.

As indicated previously, the compositions of the present invention are especially suitable for use as a nonporous membrane for separating $CO_2$ from $CO_2$-containing gas streams. Accordingly, $CO_2$ is removed from a gaseous feed stream by contacting the stream against one side, a first side, of the membrane and by withdrawing at the obverse or second side of the membrane a permeate comprising the $CO_2$. The permeate comprises the $CO_2$ in increased concentration relative to the feed stream. By "permeate" is meant that portion of the feed stream which is withdrawn at the second side of the membrane, exclusive of other fluids such as a sweep gas or liquid which may be present at the second side of the membrane.

The present invention will be better understood by reference to the following examples which are offered by way of illustration not limitation.

EXAMPLES

In the examples which follow, the separation factor (selectivity) for $CO_2$ vs. $H_2$ is expressed as follows:

$$\text{Seperation Factor} = \frac{CO_2/H_2 \text{ concentration ratio in the permeate}}{CO_2/H_2 \text{ concentration ratio in the retentate}}$$

The retentate refers to the mixture on the feed side of the membrane which is rejected by the membrane under the operating conditions. Permeability is expressed in Barrer (Barrer=$10^{-10}$ cm$^3$(STP) ·cm/(cm$^2$·s·cm Hg)). The permeability is determined by the use of the relationship between permeability and flux as follows:

$$\text{flux=permeability } (p_1-p_2)/L$$

where $p_1$ and $p_2$ are the $CO_2$ partial pressures in the retentate and permeate streams, respectively, and L is the membrane thickness. The partial pressures are determined based on concentration measurements by gas chromatography and total pressure measurements by pressure gauges. The flux is determined based on concentration measurements obtained by gas chromatography and permeate stream flow rate measurements by a flow meter.

Example 1

Synthesis of 50 wt % Glycine-Li Salt, 25 wt % Polyethylenimine and 50 wt % Polyvinylalcohol Membrane To 13.63 g of water was added 2.50 g of polyvinylalcohol (PVA) with stirring and heating at about 75° C. until a clear solution of the polymer was obtained. To this solution were added 5 g of a solution containing 50 wt % polyethylenimine in water (2.5 g of polyethylenimine) and 8 g of water at this temperature. Separately, a 50 ml glycine-Li salt solution was prepared by adding 7.979 g (0.190 mole) of LiOH.H$_2$O slowly to a glycine solution containing 14.26 g (0.190 mole) of glycine in 31.26 g water with stirring. A 16.45 ml portion of this solution containing about 5 g of glycine-Li salt was added to the above polyethylenimine/PVA solution at 75° C. with stirring for about 20 minutes to obtain a clear, homogeneous solution. The solution was then centrifuged while cooling for about 30 minutes. Following centrifugation, two pieces of the membrane were knife-cast with a gap setting of 8 mils onto a support of microporous polytetrafluoroethylene. Water was allowed to evaporate from the membrane in a nitrogen box at ambient conditions over a period of about 17 hours. The membrane was then heated in an oven at 90° C. for about 5 hours. The resulting membrane comprised about 50 wt % glycine-Li salt, 25 wt % polyethylenimine and 25 wt % polyvinylaclohol on the microporous polytetrafluoroethylene support. One piece of the membrane had a thickness of 36.1 microns (exclusive of the support), and the other piece was 30.2 microns in thickness (exclusive of the support).

Example 2

Synthesis of 50 wt % Glycine-Li Salt, 25 wt % Polyethylenimine and 25 wt % (Polyvinylalcohol/Formaldeyde at 44/1.875 by weight) Membrane To a solution of 4 g polyvinylalcohol (PVA) in 21.88 g water was added 0.4607 g of a 37 wt % formaldehyde solution in water (0.1705 g of formaldehyde). The PVA/formaldehyde weight ratio of 4/0.1705, i.e., 44 (PVA monomer molecular weight)/1.875 (6.25% of formaldehyde molecular weight), corresponds to a maximum PVA cross-linking degree of 12.5%. The solution was heated to 100° C.

and maintained at this temperature for 11.5 hours with stirring to enhance the cross-linking of PVA with formaldehyde. To this solution was added 8.341 of a 50 wt % polyethylenimine solution in water (4.171 g of polyethylenimine) with stirring to cool to 70° C. Separately, a solution containing 8.343 g (0.103 mole) of glycine-Li salt was prepared from 4.326 g (0.103 mole) of LiOH.H$_2$O, 7.730 g (0.103 mole) of glycine, and 25 g of water. This glycine-Li salt solution was then added to the above polyethylenimine/PVA/formaldehyde solution at about 70° C. with stirring for about 1 hour to obtain a clear, homogeneous solution. The solution was then centrifuged while cooling for about 30 minutes. Following centrifugation, a membrane was knife-cast with a gap setting of 8 mils onto a support of microporous polytetrafluoroethylene. Water was allowed to evaporate from the membrane overnight in a nitrogen box under ambient conditions. The membrane was then heated in an oven at 110° C. for 5 hours. The resulting membrane comprised 50 wt % glycine-Li salt, 25 wt % polyethylenimine and 25 wt % (polyvinylalcohol/formaldehyde at 44/1.875 by weight) on the microporous polytetrafluoroethylene support, and had a thickness of 55.0 microns (exclusive of the support).

Example 3

Synthesis of 50 wt % glycine-Li Salt, 30 wt % Polyethylenimine and 20 wt % (Polyvinylalcohol/Formaldehyde at 44/1.875 by weight) Membrane The membrane was synthesized according to the procedure described in Example 2 except 12.51 g of 50 wt % polyethylenimine solution (6.255 g of polyethylenimine) and a solution containing 10.43 g (0.129 mole) of glycine-Li salt were used. The resulting membrane comprised 50 wt % glycine-Li salt, 30 wt % polyethylenimine and 20 wt % (polyvinylalcohol/formaldehyde at 44/1.875 by weight) on the microporous polytetrafluoroethylene support, and had a thickness of 71.6 microns (exclusive of the support).

Example 4

Synthesis of 50 wt % Glycine-Li Salt, 30 wt % Polyethylenimine and 20 wt % (Polyvinylalcohol/Formaldehyde at 44/3.75 by weight) Membrane The membrane was synthesized according to the procedure described in Example 2 except 0.921 g of the 37 wt % formaldehyde solution (0.341 g of formaldehyde), 14.76 g of the 50 wt % polyethylenimine solution (7.38 g of polyethylenimine), and a solution containing 12.31 g (0.12 mole) of glycine-Li salt were used. The polyvinylalcohol (PVA)/formaldehyde weight ratio of 4/0.341, i.e., 44 (PVA monomer molecular weight)/3.75 (12.5% of formaldehyde molecular weight), corresponds to a maximum PVA cross-linking degree of 25%. The resulting membrane comprised about 50 wt % glycine-Li salt, 30 wt % polyethylenimine and 20 wt % (polyvinylalcohol/formaldehyde at 44/3.75 by weight) on the microporous polytetrafluoroethylene support, and had a thickness of 69.3 microns (exclusive of the support).

Example 5

Permeation Measurement of Membrane of Example 1 at Ambient Temperature

In the measurement using a gas permeation apparatus to evaluate the separation factor (selectivity) of $CO_2$ vs. $H_2$ and the permeability of $CO_2$, the membrane was placed in a permeation cell comprising the first compartment for contacting a feed stream against the upstream side of the membrane and the second compartment for withdrawing the permeate from the downstream side of the membrane. The active membrane area in the cell was 63.62 cm$^2$. A feed gas comprising 75% $H_2$ and 25% $CO_2$ under a total pressure of about 3 atm was contacted against the membrane at a flow rate of about 120 cm$^3$/min in the gas permeation apparatus at ambient temperature (about 21° C.). The permeate was swept by nitrogen under a pressure of about 1 atm and a total flow rate of 10–50 cm$^3$/min for the permeate/nitrogen stream. Both the feed and sweep streams were humidified by bubbling through deionized water prior to contacting the membrane.

For the membrane of Example 1 comprising 50 wt % glycine-Li salt, 25 wt % polyethylenimine and 25 wt % polyvinylalcohol with a thickness of 36.1 microns, the $CO_2/H_2$ selectivity result obtained was 28, and the $CO_2$ permeability was 194 Barrers.

Example 6

Permeation Measurement of Membrane of Example 2 at Ambient Temperature

The membrane of Example 2 comprising 50 wt % glycine-Li salt, 25 wt % polyethylenimine and 25 wt % (polyvinylalcohol/formaldehyde at 44/1.875 by weight) was evaluated in the same way described in Example 5. At ambient temperature (about 21° C.), the $CO_2/H_2$ selectivity result obtained was 31, and the $CO_2$ permeability was 186 Barrers. In comparison of these selectivity and permeability results with those obtained in Example 5 for the membrane of Example 1 with the same composition except formaldehyde for cross-linking, the effects of the cross-linking with formaldehyde on selectivity and permeability are not significant for the gas permeation at ambient temperature.

Example 7

Permeation Measurement of Membrane of Example 3 at Ambient Temperature

The membrane of Example 3 comprising 50 wt % glycine-Li salt, 30 wt % polyethylenimine and 20 wt % (polyvinylalcohol/formaldehyde at 44/1.875 by weight) was evaluated in the same way described in Example 5. At ambient temperature (about 21° C.), the $CO_2/H_2$ selectivity result obtained was 37, and the $CO_2$ permeability was 187 Barrers. In comparison of these selectivity and permeability results with those obtained in Example 6 for the membrane of Example 2 with the same composition except the concentrations of polyethylenimine and polyvinylalcohol/formaldehyde in the membrane, the selectivity increases whereas the permeability remains nearly constant as the concentration of polyethylenimine in the membrane increases. This is presumably due to the enhanced $CO_2$ reaction and $H_2$ solubility reduction with the increased polyethylenimine concentration in the membrane.

Example 8

Permeation Measurement of Membrane of Example 4 at Ambient Temperature

The membrane of Example 4 comprising 50 wt % glycine-Li salt, 30 wt % polyethylenimine and 20 wt % (polyvinylalcohol/formaldehyde at 44/3.75 by weight) was evaluated in the same way described in Example 5. At ambient temperature (about 21° C.), the $CO_2/H_2$ selectivity result obtained was 35, and the $CO_2$ permeability was 210 Barrers. By comparing these selectivity and permeability results with those obtained in Example 7 for the membrane of Example 3 with the same composition except the amount of formaldehyde for cross-linking, the effects of the cross-linking with formaldehyde on selectivity and permeability are not significant for the gas permeation at ambient temperature. This is the same conclusion made above in Example 6.

Example 9
Permeation Measurement of Membrane of Example 1 at Higher Temperature The membrane of Example 1 comprising 50 wt % glycine-Li salt, 25 wt % polyethylenimine and 25 wt % polyvinylalcohol with a thickness of 30.2 microns was evaluated in the same way described in Example 5 except using a gas permeation apparatus with temperature capability ranging from ambient temperature to 80° C., which is the typical operating temperature for proton-exchange membrane (PEM) fuel cells used for electric vehicles. For this membrane, $CO_2/H_2$ selectivities and $CO_2$ permeabilities were measured at ambient temperature (about 21° C.), 50, and 80° C. The selectivity and permeability results obtained are shown in FIG. 1 in the Arrhenius plot as a function of the reciprocal of absolute temperature. As shown in this figure, both selectivity and permeability increase with temperature. This is presumably due to higher $CO_2$ reaction rate and lower $H_2$ solubility in the membrane at higher temperature. The increase of both selectivity and permeability with temperature is unusual in view of typical membranes based on the solution-diffusion mechanism, for which an increase in permeability is always accompanied with a reduction in selectivity. From this figure, the activation energy for permeation has been obtained to be 7.71 kcal/mole.

As shown in Examples 5–9, the membranes of the present invention may be employed for removal of $CO_2$ from a gas mixture of 75% $H_2$ and 25% $CO_2$. This gas mixture simulates a typical reformate based on the relative ratio of $H_2$ and $CO_2$.

Example 10
Permeation Measurement of 60 wt % Glycine-Li Salt and 40 wt % (Polyethylenimine/Formaldehyde at 44/0.94 by weight) Membrane at Higher Temperature (Comparative Example)

A membrane comprising 60 wt % glycine-Li salt and 40 wt % (polyvinylalcohol (PVA)/formaldehyde at 44/0.94 by weight) without polyamine was synthesized. The synthesis procedure used was similar to that described in Example 2 except 0.231 g of the 37 wt % formaldehyde solution (0.0855 g of formaldehyde), a solution containing 6.128 g (0.0757 mole) of glycine-Li salt, and no polyethylenimine were used. The PVA/formaldehyde weight ratio of 4/0.0855, i.e., 44 (PVA monomer molecular weight)/0.94 (3.125% of formaldehyde molecular weight), corresponds to a maximum PVA cross-linking degree of 6.25%. The resulting membrane had a thickness of 29.0 microns (exclusive of the support) on the microporous polytetrafluoroethylene support.

This membrane was evaluated in the same way described in Example 9 at the typical PEM fuel cell temperature of 80° C. At this temperature, the $CO_2/H_2$ selectivity result obtained was 61, and the permeability was 1067 Barrers. These selectivity and permeability results are compared with those obtained in Example 9 (FIG. 1) for the membrane of the present invention comprising 50 wt % glycine-Li salt, 25 wt % polyethylenimine and 25 wt % polyvinylalcohol in Table 1. As shown in this table, the membrane of this invention with polyethylenimine shows both higher selectivity and permeability than the membrane of our earlier invention without polyethylenimine. Thus, the polyamine in the membrane increases both selectivity and permeability at the typical PEM fuel cell temperature. This is presumably due to the enhanced $CO_2$ reaction with the polyamine in the membrane. In addition, the membrane of the earlier invention with 60 wt % glycine-Li salt should have higher selectivity and permeability than that with 50 wt % glycine-Li salt. Therefore, the membrane of the present invention with 50 wt % glycine-Li salt should have more selectivity and permeability advantages over the earlier invention with the same aminoacid salt concentration than those shown in this table.

TABLE 1

Membrane of This Invention with Polyamine Shows Higher Selectivity/Permeability Than Example 10 Membrane Without It at 80° F.

| Membrane | Polyethylenimine in Membrane (wt %) | Glycine-Li Salt in Membrane (wt %) | $CO_2/H_2$ Selectivity | $CO_2$ Permeability (Barrer*) |
|---|---|---|---|---|
| This Invention, Example 9 | 25 | 50 | 75 | 1230 |
| Example 10 | 0 | 60 | 61 | 1070 |

*Barrer = $10^{-10}$ $cm^3$ (STP) · cm/($cm^2$ · s · cm Hg)

Example 11
Permeation Measurement of 50 wt % Glycine-Li Salt and 50 wt % (Polyvinylalcohol/Formaldehyde at 44/1.875 by weight) Membrane at Ambient Temperature (Comparative Example).

A membrane comprising 50 wt % glycine-Li salt and 50 wt % (polyvinylalcohol (PVA)/formaldehyde at 44/1.875 by weight) without polyamine was synthesized according to our earlier patent application (U.S. Ser. No. 499,267). The synthesis procedure was similar to that described in Examples 2 and 10 except 3 g of PVA, 0.3455 g of the 37 wt % formaldehyde solution (0.1278 g of formaldehyde), a solution containing 3.128 g (0.0386 mole) of glycine-Li salt, and no polyethylenimine were used in this synthesis. The PVA/formaldehyde weight ratio of 3/0.1278, i.e., 44 (PVA monomer molecular weight)/1.875 (6.25% of formaldehyde molecular weight), corresponds to a maximum PVA cross-linking degree of 12.5%. The resulting membrane had a thickness of 30.1 microns (exclusive of the support) on the microporous polytetrafluoroethylene support.

This membrane was evaluated in the same way described in Example 5 at ambient temperature (about 21° C.). At this temperature, the $CO_2/H_2$ selectivity result obtained was 19, and the permeability was 192 Barrers. In comparison of these selectivity and permeability results with those obtained in Examples 6 and 7 for the membranes of the present invention with polyethylenimine and the same weight ratio of PVA and formaldehyde for cross-linking, the membranes of this invention with the polyamine have higher selectivity at about the same permeability than the membrane of the earlier invention without the polyamine. As mentioned, the cross-linking with formaldehyde does not affect the selectivity and permeability results for the gas permeation at ambient temperature. By comparing the selectivity and permeability results of Example 11 with those of Examples 5 and 8 for the membranes of the present invention with polyethylenimine and different weight ratios of PVA and formaldehyde for cross-linking, the membranes of this invention with the polyamine again have higher selectivity at about the same permeability than the membrane of the earlier invention without the polyamine.

Figure 2:
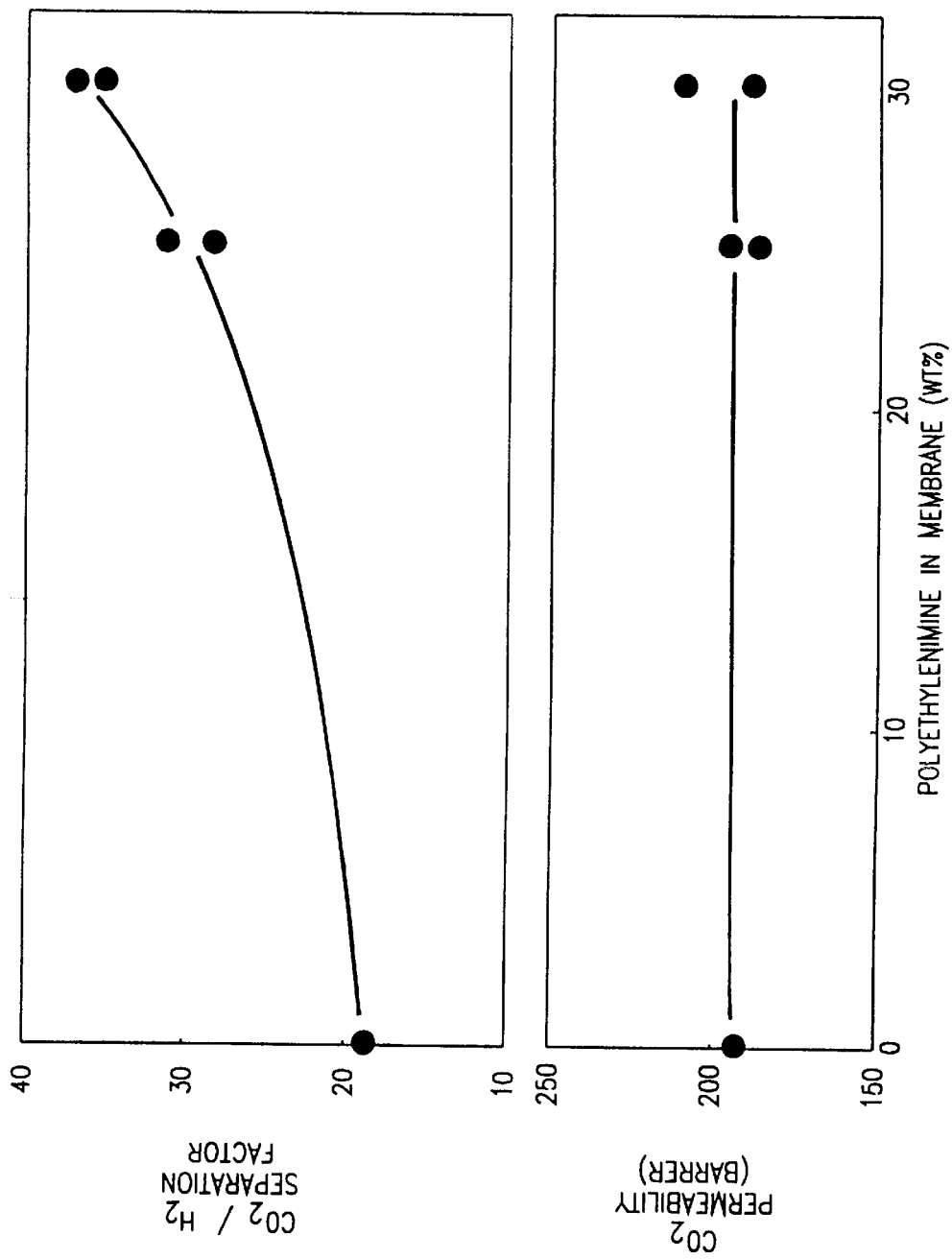
FIG. 2 shows the selectivity increases with polyamine in the membrane for the membranes of the present invention.

FIG. 2 shows the selectivity and permeability results obtained in Examples 5–8 and 11 at ambient temperature (about 21° C.) as a function of the concentration of polyethylenimine in membrane. As shown in this figure, the selectivity increases whereas the permeability remains nearly constant as the polyamine concentration in the membrane increases. This is presumably due to the enhanced $CO_2$ reaction and $H_2$ solubility reduction with the increased polyamine concentration in the membrane.

What is claimed is:

1. A membrane formed from a composition comprising:
   (a) a polyamine or its polymer blend,
   (b) at least one salt of an aminoacid, the salt of the aminoacid being present in an amount ranging from about 10 to about 80 wt % based on the total weight of the composition, wherein the aminoacid salt is selected from salts having the formulae:

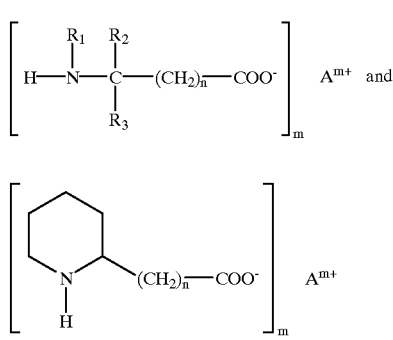

wherein $R_1$, $R_2$ and $R_3$ are hydrogen or alkyl groups having from 1 to 4 carbon atoms, n is an integer ranging from 0 to 4, $A^{m+}$ is a cation having a valence of 1 to 3 and selected from metals of Groups IA, IIA, and IIIA of the Periodic Table of Elements and an amine cation having the formula:

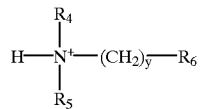

wherein $R_4$ and $R_5$ are hydrogen or alkyl groups having from 1 to 4 carbon atoms, $R_6$ is hydrogen, an alkyl group of from 1 to 4 carbon atoms or an alkyl amine of from 2 to 6 carbon atoms and 1 to 4 nitrogen atoms, y is an integer ranging from 1 to 4, and m is an integer equal to the valence of the cation, and
   (c) about 1 to about 20 wt % of cross-linking agent based on the total weight of composition.

2. The composition of claim 1 wherein the polyamine is selected from the group consisting of polyethylenimine, polyallylamine, poly-N-1,2dimethylpropylallylamine, poly-2-vinylpiperidine, poly-4-vinylpiperidine, blends and copoloymers thereof.

3. The composition of claim 1 wherein the polyamine is polyethylenimine.

4. The composition of claim 1 wherein said polymer blend includes a polymer selected from the group consisting of polyvinylalcohol, polyvinylpyrrolidone, polyethyleneoxide, polyacrylamide, polyvinylacetate, blends and copolymers thereof.

5. The composition of claim 4 wherein the polymer is polyvinylalcohol.

6. The composition of claim 1 wherein the cross-linking agent is selected from the group consisting of formaldehyde, divinyl sulfone, toluene disocyanate, glyoxal, trimethylol melamine, terephthalaldehyde, epichloroydrin, vinyl acrylate, and maleic anhydride.

7. The composition of claim 1 wherein the cross-linking agent is formaldehyde.

8. A method for producing the nonporous membrane of claim 1 having properties sufficient to enable separation of $CO_2$ from a gaseous stream containing $CO_2$, the method comprising:

forming a casting solution of a solvent, a polyamine or its polymer blend and at least one salt of an aminoacid, the salt being present in an amount ranging from about 10 to about 80 wt % based on the total weight of polyamine, or its polymer blend, and salt, wherein the salt is selected from salts having the formulae:

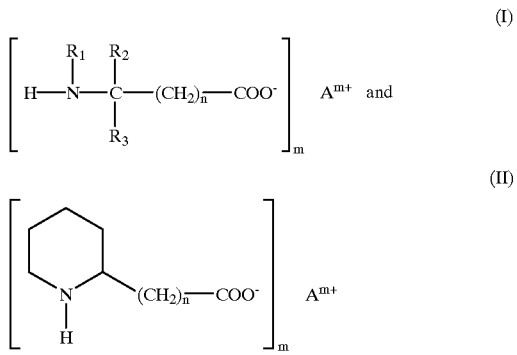

wherein $R_1$, $R_2$ and $R_3$ are hydrogen or alkyl groups having from 1 to 4 carbon atoms, n is an integer ranging from 0 to 4, $A^{m+}$ is a cation having a valence of from 1 to 3 and selected from metals of Groups IA, IIA, and IIIA of the Periodic Table of Elements and an amine cation having the formula:

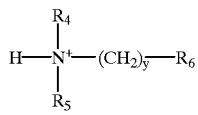

wherein $R_4$ and $R_5$ are hydrogen or alkyl groups having from 1 to 4 carbon atoms, $R_6$ is hydrogen, an alkyl group of from 1 to 4 carbon atoms or an alkyl amine of from 2 to 6 carbon and 1 to 4 nitrogen atom, y is an integer ranging from 1 to 4, and m is an integer equal to the valence of the cation;

casting the solution on a substrate; and evaporating the solvent whereby a nonporous membrane is formed.

9. A nonporous membrane formed from the composition of claim 1, 2, 4 or 6.

10. A process for separating $CO_2$ from a $CO_2$-containing gas stream comprising:

contacting a $CO_2$-containing gas stream with one side of the non-porous, $CO_2$ selectively permeable membrane of claim 1 whereby $CO_2$ is selectively transported through the membrane; and withdrawing from the obverse side of the membrane a permeate containing $CO_2$ whereby $CO_2$ is selectively removed from the gaseous stream.

* * * * *